(12) United States Patent
Furuichi

(10) Patent No.: US 11,627,584 B2
(45) Date of Patent: *Apr. 11, 2023

(54) SERVER DEVICE, INFORMATION PROCESSING DEVICE AND METHOD

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,491

(22) Filed: Nov. 30, 2021

(65) Prior Publication Data

US 2022/0086845 A1     Mar. 17, 2022

Related U.S. Application Data

(63) Continuation of application No. 16/077,451, filed as application No. PCT/JP2017/005740 on Feb. 16, 2017, now Pat. No. 11,224,047.

(30) Foreign Application Priority Data

Mar. 11, 2016 (JP) ................................. 2016-048251

(51) Int. Cl.
   *H04B 7/26*      (2006.01)
   *H04W 16/14*     (2009.01)
   (Continued)

(52) U.S. Cl.
   CPC .......... *H04W 72/082* (2013.01); *H04B 7/265* (2013.01); *H04B 7/2609* (2013.01);
   (Continued)

(58) Field of Classification Search
   CPC ..... H04B 7/2609; H04B 7/265; H04W 16/14; H04W 52/283; H04W 72/048; H04W 72/082
   See application file for complete search history.

(56) References Cited

U.S. PATENT DOCUMENTS 7,894,503 B2   2/2011  Azenkot et al.
8,228,865 B2   7/2012  Khandelwal et al.
               (Continued)

FOREIGN PATENT DOCUMENTS

CN     104254076 A    12/2014
EP     2823660 A1     1/2015
               (Continued)

OTHER PUBLICATIONS

Extended European Search Report dated Feb. 1, 2019, issued in corresponding EP Application No. 17762851.8, 8 pages.

*Primary Examiner* — Alpus Hsu
(74) *Attorney, Agent, or Firm* — Xsensus LLP

(57) ABSTRACT

A computing device includes circuitry configured to transmit, to a server device, information of channels that can be used, and receive a plurality of lists from the server device. The lists are generated from the information of the channels that can be used. Each of the lists identifies ranges and indicates an available frequency and transmission power of the frequency for each of the ranges. Each of the ranges is a geographic region. Each of the lists identifies multiple geographic regions. The plurality of geographic regions is a same plurality of geographic regions for all of the lists. The frequency corresponding to any one of the ranges in any one of the lists is not set in an overlapped manner to the frequency corresponding to the same one of the ranges in any other one of the lists.

8 Claims, 12 Drawing Sheets

(51) Int. Cl.
  *H04W 52/28* (2009.01)
  *H04W 72/04* (2009.01)
  *H04W 72/08* (2009.01)
(52) U.S. Cl.
  CPC ......... *H04W 16/14* (2013.01); *H04W 52/283* (2013.01); *H04W 72/048* (2013.01)

(56) References Cited

U.S. PATENT DOCUMENTS

| | | |
|---|---|---|
| 8,666,317 B2 | 3/2014 | Choudhury et al. |
| 8,792,446 B2 | 7/2014 | Tsai et al. |
| 9,055,584 B2 | 6/2015 | Tsuda |
| 9,345,002 B2 | 5/2016 | Miao et al. |
| 9,386,510 B2 | 7/2016 | Regan |
| 9,425,945 B2 | 8/2016 | Sugahara |
| 9,439,215 B2 | 9/2016 | Lee et al. |
| 9,467,867 B1 | 10/2016 | Hasegawa et al. |
| 9,609,523 B2 | 3/2017 | Takekawa et al. |
| 9,699,699 B1 | 7/2017 | Oroskar et al. |
| 9,743,412 B2 | 8/2017 | Yanagisawa et al. |
| 9,775,146 B2 | 9/2017 | Tsuda |
| 9,781,719 B2 | 10/2017 | Hasegawa et al. |
| 10,251,170 B2 | 4/2019 | Tsuda |
| 10,476,615 B2 | 11/2019 | Yerramalli et al. |
| 2007/0217455 A1 | 9/2007 | Haeusler |
| 2008/0043813 A1 | 2/2008 | Azenkot et al. |
| 2010/0105400 A1 | 4/2010 | Palmer |
| 2011/0092220 A1 | 4/2011 | Bernini et al. |
| 2011/0237268 A1 | 9/2011 | Tsuda |
| 2013/0078924 A1 | 3/2013 | Choudhury |
| 2014/0003282 A1 | 1/2014 | Kafle et al. |
| 2014/0004872 A1 | 1/2014 | Li |
| 2014/0086212 A1 | 3/2014 | Kafle et al. |
| 2014/0219235 A1 | 8/2014 | Kimura |
| 2015/0011233 A1 | 1/2015 | Kazmi |
| 2015/0119059 A1 | 4/2015 | Miao |
| 2015/0173055 A1 | 6/2015 | Ishizu et al. |
| 2016/0021661 A1 | 1/2016 | Yerramalli et al. |
| 2016/0073269 A1 | 3/2016 | Bajko |
| 2016/0182139 A1 | 6/2016 | Yi et al. |

FOREIGN PATENT DOCUMENTS

| | | |
|---|---|---|
| JP | 2012-151815 A | 8/2012 |
| JP | 2014138368 A | 7/2014 |
| WO | 2014/206282 A1 | 12/2014 |
| WO | WO-2015060033 A1 | 4/2015 |

SERVER DEVICE, INFORMATION PROCESSING DEVICE AND METHOD

CROSS-REFERENCE TO RELATED APPLICATIONS

This application is a continuation of U.S. application Ser. No. 16/077,451, filed Aug. 11, 2018, which is based on PCT filing PCT/JP2017/005740, filed Feb. 16, 2017, and claims priority to Japanese Application No. 2016-048251, filed Mar. 11, 2016, the entire contents of each are incorporated herein by reference.

TECHNICAL FIELD

The present disclosure relates to a server device, and an information processing device and method.

BACKGROUND ART

As a countermeasure to alleviate shortage of future frequency resources, secondary usage of frequencies has been discussed. Secondary usage of frequencies means that part of or all of frequency channels allocated to a certain system with a higher priority is secondarily used by another system. Generally, a system to which a frequency channel is allocated with a higher priority is called "primary system", and a system that secondarily uses the frequency channel is called "secondary system".

TV whitespaces are an example of frequency channels that are expected to be secondarily used. TV whitespaces mean frequency channels that are allocated to a TV broadcast system serving as a primary system but are not locally used by the TV broadcast system. By allowing a secondary system to use those TV whitespaces, efficient utilization of frequency resources can be achieved. There are a plurality of standards for wireless access schemes in a physical layer (PHY) and MAC layer for enabling secondary usage of the TV whitespaces, such as IEEE802.22, IEEE802.11af, and European Computer Manufacturer Association (ECMA)-392 (CogNea).

The IEEE802.19.1-2014 is a standard which aims to smoothly coexist a plurality of secondary systems using different wireless access schemes. For example, functions for coexistence of secondary systems are grouped into three function entities, i.e., a coexistence manager (CM), a coexistence enabler (CE), and a coexistence discovery and information server (CDIS). The CM is a functional entity for mainly making a decision for coexistence. The CE is a functional entity serving as an interface for mediating transmission of commands and exchange of information between the CM and a secondary usage node. The CDIS is a functional entity serving as a server for centrally managing information of a plurality of secondary systems.

For example, regarding those functional entities, Patent Literature 1 cited below discloses a technology in which a plurality of functional entities perform neighbor discovery in cooperation with each other.

Further, a network coexistence method for wireless communication devices is specified also in ETSI EN 303 387 as well as in IEEE802.19.1-2014. In both of these standards, two types of coexistence services of Management Service and Information Service are specified.

CITATION LIST

Patent Literature

Patent Literature 1: WO 2012/132804

DISCLOSURE OF INVENTION

Technical Problem

It is desired to effectively apply these network coexistence services to a mobile body such as a car and an unmanned aerial vehicle (UAV) whose location can change every moment.

Therefore, the present disclosure proposes a new and improved server device, information processing device and method which can effectively apply a network coexistence service to a mobile body whose location can change every moment.

Solution to Problem

According to the present disclosure, there is provided a server device including: a control unit configured to provide a plurality of lists in which an available frequency and transmission power of the frequency are described for each predetermined range determined on a basis of a predetermined criterion so that the frequency is not set in an overlapped manner in the same predetermined range, to an external device which uses the frequency.

In addition, according to the present disclosure, there is provided an information processing device including: a communication unit configured to receive a plurality of lists in which an available frequency and transmission power of the frequency are described for each predetermined range determined on a basis of a predetermined criterion so that the frequency is not set in an overlapped manner in the same predetermined range, from an external device; and a setting unit configured to select one list from the plurality of lists received by the communication unit using a predetermined criterion and set the frequency and transmission power of the frequency described in the selected list as parameters on a basis of current location information.

In addition, according to the present disclosure, there is provided a method including: providing a plurality of lists in which an available frequency and transmission power of the frequency are described for each predetermined range determined on a basis of a predetermined criterion so that the frequency is not set in an overlapped manner in the same predetermined range, to an external device which uses the frequency.

In addition, according to the present disclosure, there is provided a method including: receiving a plurality of lists in which an available frequency and transmission power of the frequency are described for each predetermined range determined on a basis of a predetermined criterion so that the frequency is not set in an overlapped manner in the same predetermined range, from an external device; and selecting one list from the received plurality of lists using a predetermined criterion and setting the available frequency and transmission power of the frequency described in the selected list as parameters on a basis of current location information.

Advantageous Effects of Invention

As described above, according to the present disclosure, it is possible to provide a new and improved server device, information processing device and method which can effectively apply a network coexistence service to a mobile body whose location can change every moment.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
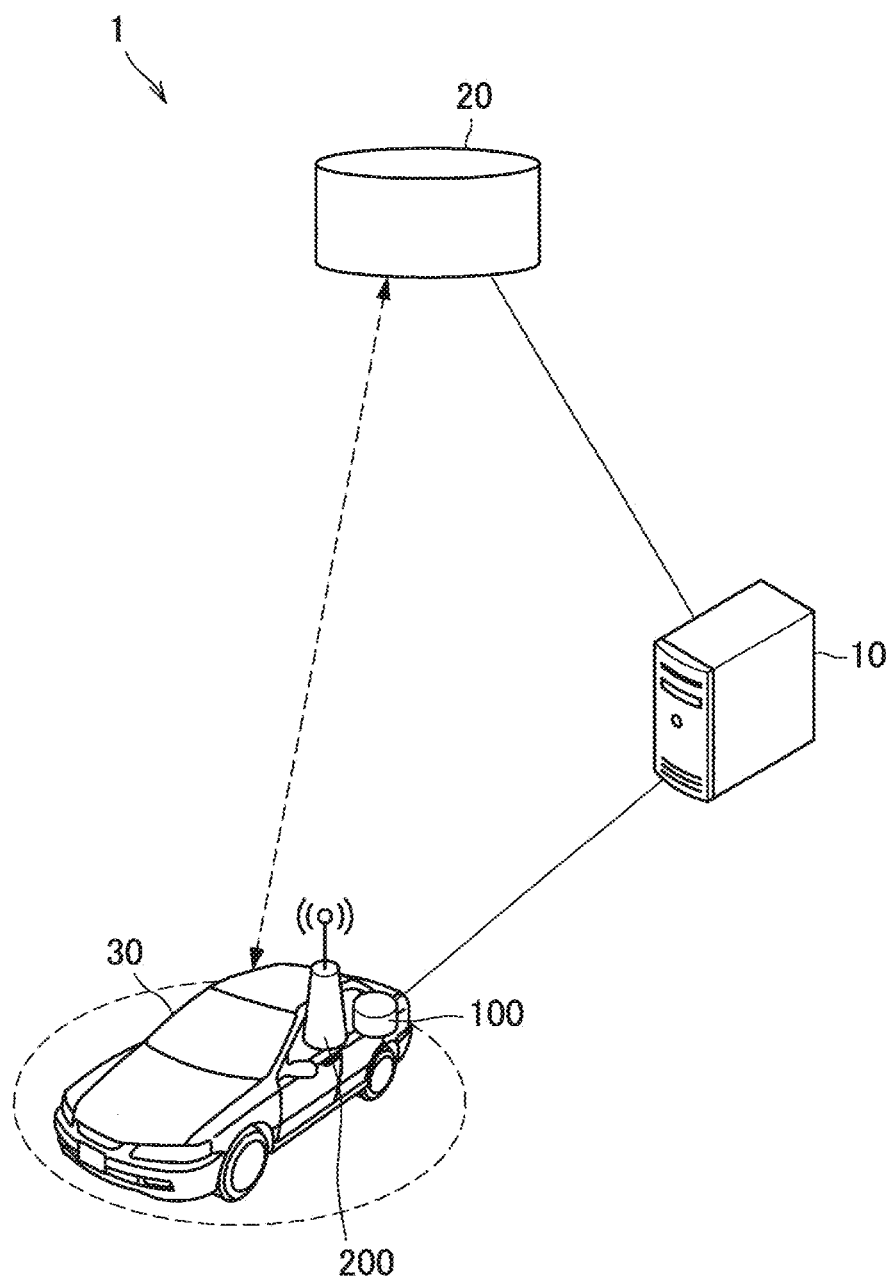
FIG. 1 is an explanatory view illustrating an overall configuration example of a communication system 1 according to a first example of an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Embodiment of present disclosure
1.1. Outline
1.2. First example
1.2.1. Overall system configuration
1.2.2. Configuration example
1.2.3. Operation example
1.3. Second example
1.3.1. Overall system configuration
1.3.2. Operation example
1.4. Third example
1.5. Modified example
2. Conclusion

1. EMBODIMENT OF PRESENT DISCLOSURE 1.1. Outline

Outline of an embodiment of the present disclosure will be described first before the embodiment of the present disclosure is described in detail.

As described above, as one countermeasure to alleviate shortage of future frequency resources, secondary usage of frequencies has been discussed. In standards such as IEEE802.19.1-2014 and ETSI EN 303 387, a network coexistence method for wireless communication devices is specified. In both of these standards, two types of coexistence services of Management Service and Information Service are specified.

Circumstances will be considered where, in an environment where a plurality of wireless networks which are the same type or different types of wireless networks are mixed, a wireless communication device is provided at a mobile body such as a car and an UAV, whose location can change every moment, and the wireless communication device tries to coexist with the above-described wireless networks. Here, frequency bands of the above-described wireless networks are no concern.

In both of the above-described standards such as IEEE802.19.1-2014 and ETSI EN 303 387, a coexistence service dedicated to a specific geographical location is assumed. That is, operational parameters such as a recommended frequency and transmission power are determined dependently on the specific geographical location. However, in the case where the wireless communication device provided at the above-described mobile body such as a car, a drone and a UAV, whose location can change every moment coexists with wireless networks, the operational parameters dependent on the specific geographical location are not useful for the wireless communication device.

Further, in the above-described standards such as IEEE802.19.1-2014 and ETSI EN 303 387, in the Management Service, it is possible to calculate an optimal (or quasi-optimal) operational parameter at a current geographical location of the wireless communication device using advanced algorithm and provide the optimal operational parameter to the wireless communication device. In the Information Service, it is possible to provide information such as rank information of a channel recommended at a current geographical location of the wireless communication device to the wireless communication device. However, in the case where the wireless communication device provided at the above-described mobile body such as a car, a drone and a UAV, whose location can change every moment coexists with wireless networks, it is not easy to establish algorithm which reduces interference which can occur among a plurality of wireless communication devices while movement of the wireless communication device is taken into account.

Therefore, in view of the above-described points, the present discloser has studied hard a technology which allows a network coexistence service to be effectively applied to a mobile body whose location can change every moment. As a result, the present discloser has devised a technology which allows a network coexistence service to be effectively applied to a mobile body whose location can change every moment, as will be described below.

The outline of the embodiment of the present disclosure has been described above. Subsequently, the embodiment of the present disclosure will be described in detail.

1.2. First Example

1.2.1. Overall System Configuration

FIG. 1 is an explanatory view illustrating an overall configuration example of a communication system 1 according to a first example of the embodiment of the present disclosure. The overall configuration example of the communication system 1 according to the first example of the embodiment will be described below using FIG. 1.

As illustrated in FIG. 1, the communication system 1 includes a communication control determination device 10, a geo-location database (GLDB) 20 and a mobile body 30. While FIG. 1 illustrates a car as the mobile body 30, in the present disclosure, the mobile body is not limited to a car. Further, the mobile body 30 includes a communication control device 100 and a wireless communication device 200. Note that, while, in FIG. 1, the communication control device 100 and the wireless communication device 200 are separately illustrated for the purpose of illustration, the present disclosure is not limited to such an example, and the communication control device 100 and the wireless communication device 200 may be the same device.

The communication control determination device 10 is an example of a server device of the present disclosure. The communication control determination device 10 is a device introduced for controlling coexistence among a plurality of secondary systems which use frequency channels allocated to a system (primary system) whose operation is approved on the basis of predetermined license. Note that examples of the primary system encompass TV broadcast systems, program making and special events (PMSE), radars (military radar, ship-based radar, weather radar, or the like), fixed satellite services (FSS), earth exploration satellite services (EESS), and the like.

In the present embodiment, the communication control determination device 10 has a function of generating a plurality of lists (recommended channel lists) set so that a frequency is not set in an overlapped manner in the same region and holding the plurality of lists. A functional configuration example of the communication control determination device 10 will be described in detail later.

The GLDB 20 has a function of notifying each of the secondary systems of lists of frequency channels which can be secondarily used and/or transmission power, and, typically, performs protection (incumbent protection) of the primary system. In the present embodiment, the GLDB 20 has a function of providing information of frequency channels which can be used to the wireless communication device 200.

The communication control device 100, which is an example of an information processing device of the present disclosure, is a device which transmits commands and mediates information between the communication control determination device 10 and the wireless communication device 200. In the present embodiment, the communication control device 100 selects one of a plurality of recommended channel lists generated by the communication control determination device 10 and sets operational parameters such as a frequency channel and transmission power to be used by the wireless communication device 200 on the basis of the list. A functional configuration example of the communication control device 100 will be described in detail later.

The wireless communication device 200 performs wireless communication by secondarily using frequency channels allocated to the primary system on the basis of the operational parameters determined by the communication control device 100.

The overall configuration example of the communication system 1 according to the first example of the embodiment of the present disclosure has been described above using FIG. 1. Subsequently, functional configuration examples of respective devices constituting the communication system 1 will be described.

1.2.2. Configuration Example (1) Communication Control Determination Device 10

Figure 2:
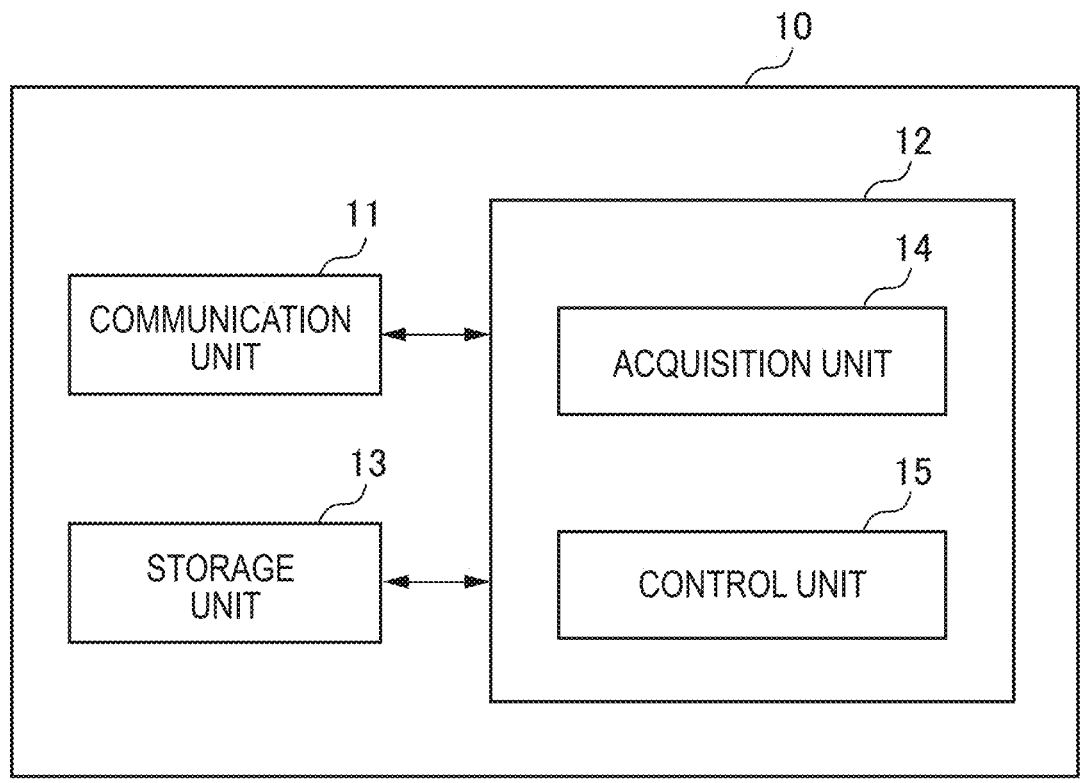
FIG. 2 is an explanatory view illustrating a functional configuration example of a communication control determination device 10 according to the first example of the embodiment.

FIG. 2 is an explanatory view illustrating a functional configuration example of the communication control determination device 10 according to the first example of the embodiment of the present disclosure. The functional configuration example of the communication control determination device 10 according to the first example of the embodiment of the present disclosure will be described below using FIG. 2.

As illustrated in FIG. 2, the communication control determination device 10 includes a communication unit 11, a processing unit 12 and a storage unit 13. Further, the processing unit 12 includes an acquisition unit 14 and a control unit 15.

The communication unit 11 performs communication of information with another device. The communication unit 11 can, for example, include an antenna in a case of wireless communication and include an interface for wired communication in a case of wired communication. Further, the communication unit 11 can include a communication circuit for communication processing of information. The communication unit 11 transmits information received from another device to the processing unit 12.

The processing unit 12 is made up of, for example, a central processing unit (CPU), a read only memory (ROM), a random access memory (RAM), and the like and provides various functions of the communication control determination device 10. Note that the processing unit 12 can further include a constituent element in addition to the acquisition unit 14 and the control unit 15. That is, the processing unit 12 can also perform operation in addition to operation of the acquisition unit 14 and the control unit 15.

The acquisition unit 14 acquires various kinds of information that the communication unit 11 receives from another device.

The control unit 15 controls operation of the communication control determination device 10. In a case where the control unit 15 controls operation of the communication control determination device 10, the control unit 15 can use information acquired by the communication unit 11 and information stored on the storage unit 13.

In the present embodiment, the control unit 15 generates a plurality of recommended channel lists which are set so that a frequency is not set in an overlapped manner in the same region. The control unit 15 causes the plurality of recommended channel lists which are set so that a frequency is not set in an overlapped manner in the same region to be stored in the storage unit 13. The lists generated by the control unit 15 and stored in the storage unit 13 are referred to when the communication control device 100 sets operational parameters.

Providing information for network coexistence which is limited to a specific geographical location to the wireless communication device 200 is less likely to be beneficial in the case where the wireless communication device 200 is mounted on the mobile body 30 whose location can change every moment, because a usage situation of ambient frequency channels frequently changes by movement of the mobile body 30. Therefore, in the case where the wireless communication device 200 is mounted on the mobile body 30, it is desirable that the communication control determination device 10 provides information in a region unit of a wider range instead of information at a specific geographical location.

Figure 3:
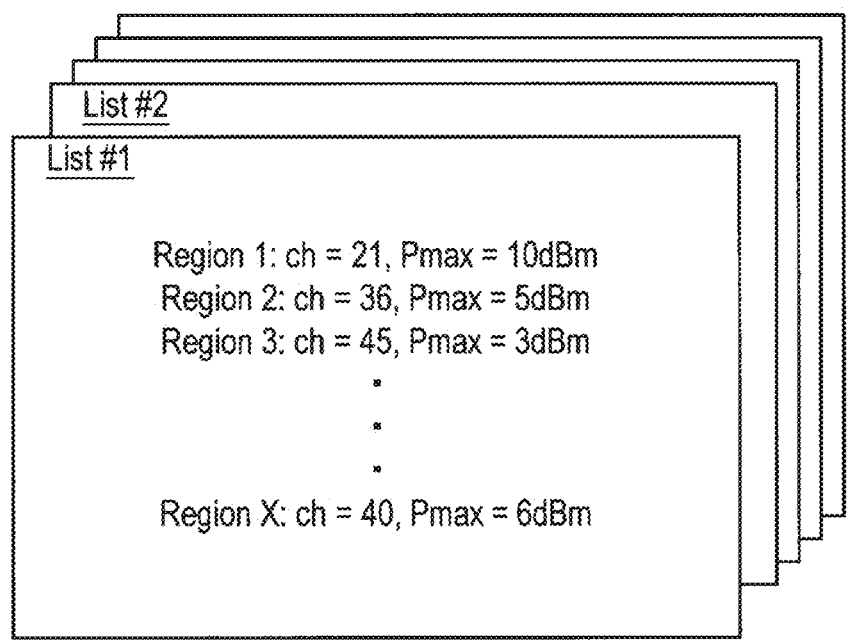
FIG. 3 is an explanatory view illustrating an example of a list generated by a control unit 15.

FIG. 3 is an explanatory view illustrating an example of lists generated by the control unit 15. The control unit 15 generates a plurality of recommended channel lists in which information of frequency channels which can be secondarily used and transmission power is described for each of a plurality of regions. The control unit 15 generates lists so that a frequency is not set in an overlapped manner in the same region when generating the plurality of recommended channel lists. That is, in the example illustrated in FIG. 3, lists are generated such that, if a channel (ch) 21 is set in one Region 1, ch 21 is not set in Region 1 in other lists.

Figure 4:
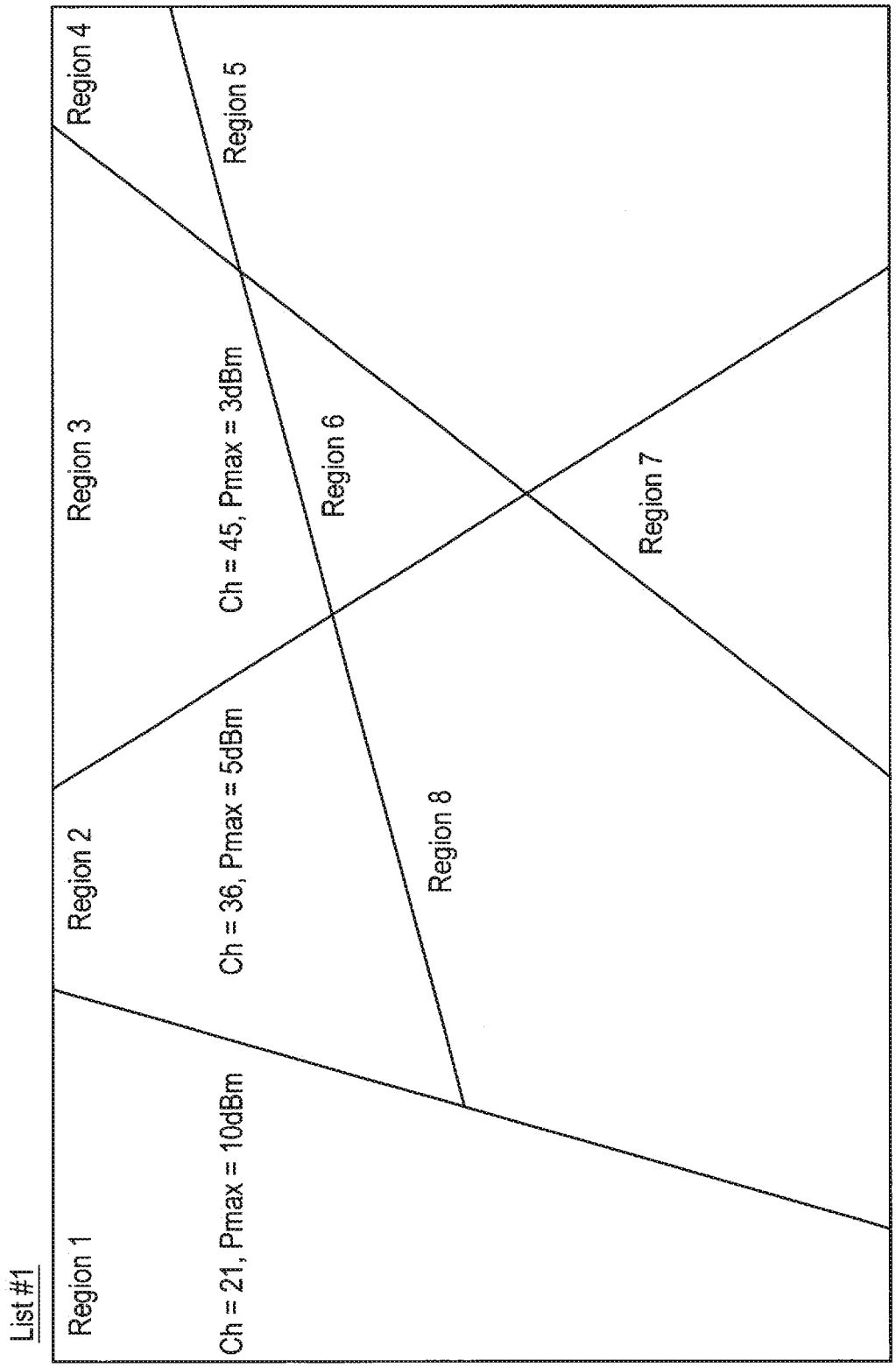
FIG. 4 is an explanatory view illustrating an example of a channel and transmission power set in each region by the list generated by the control unit 15.
Figure 5:
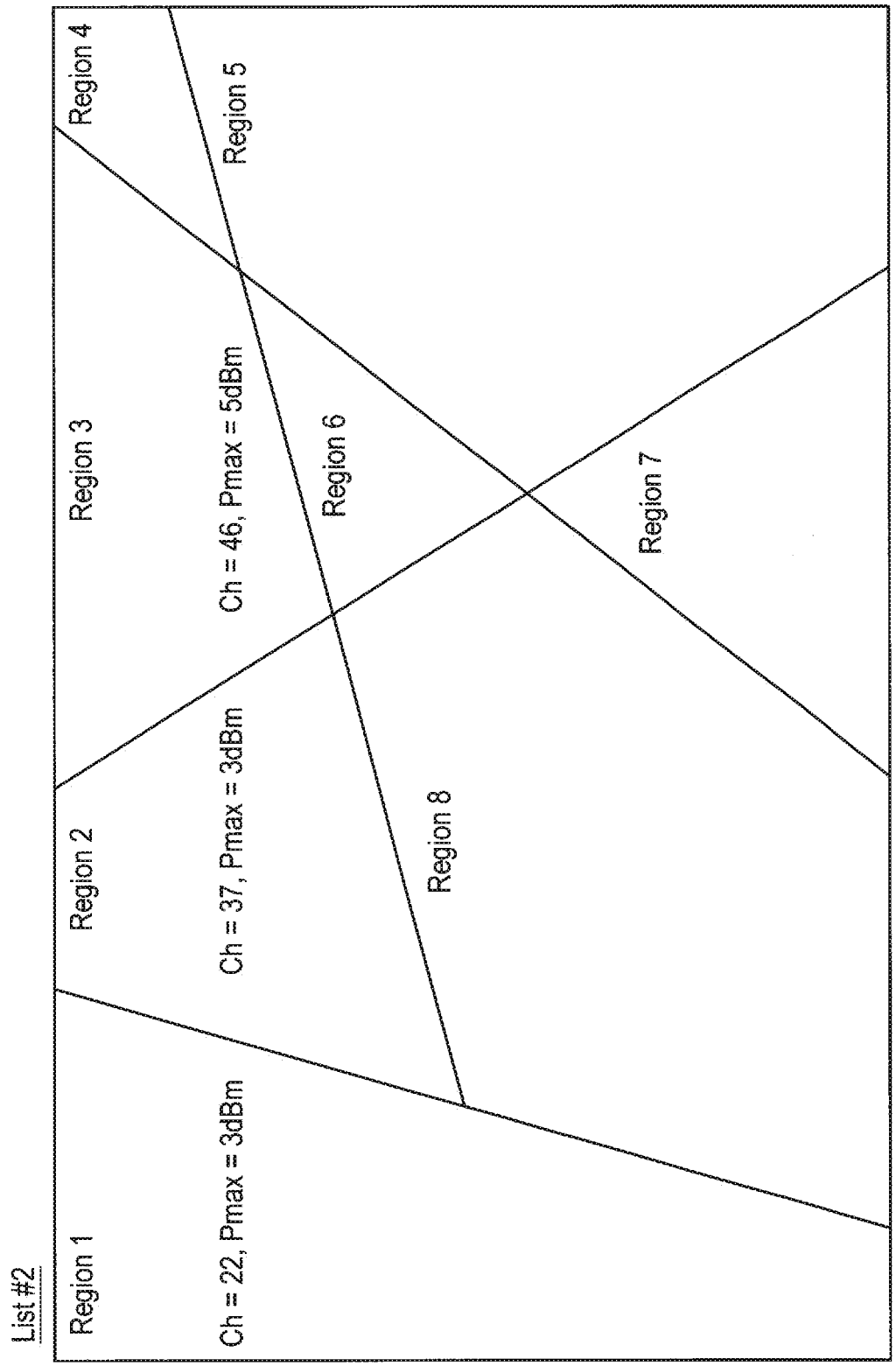
FIG. 5 is an explanatory view illustrating an example of a channel and transmission power set in each region by the list generated by the control unit 15.
Figure 6:
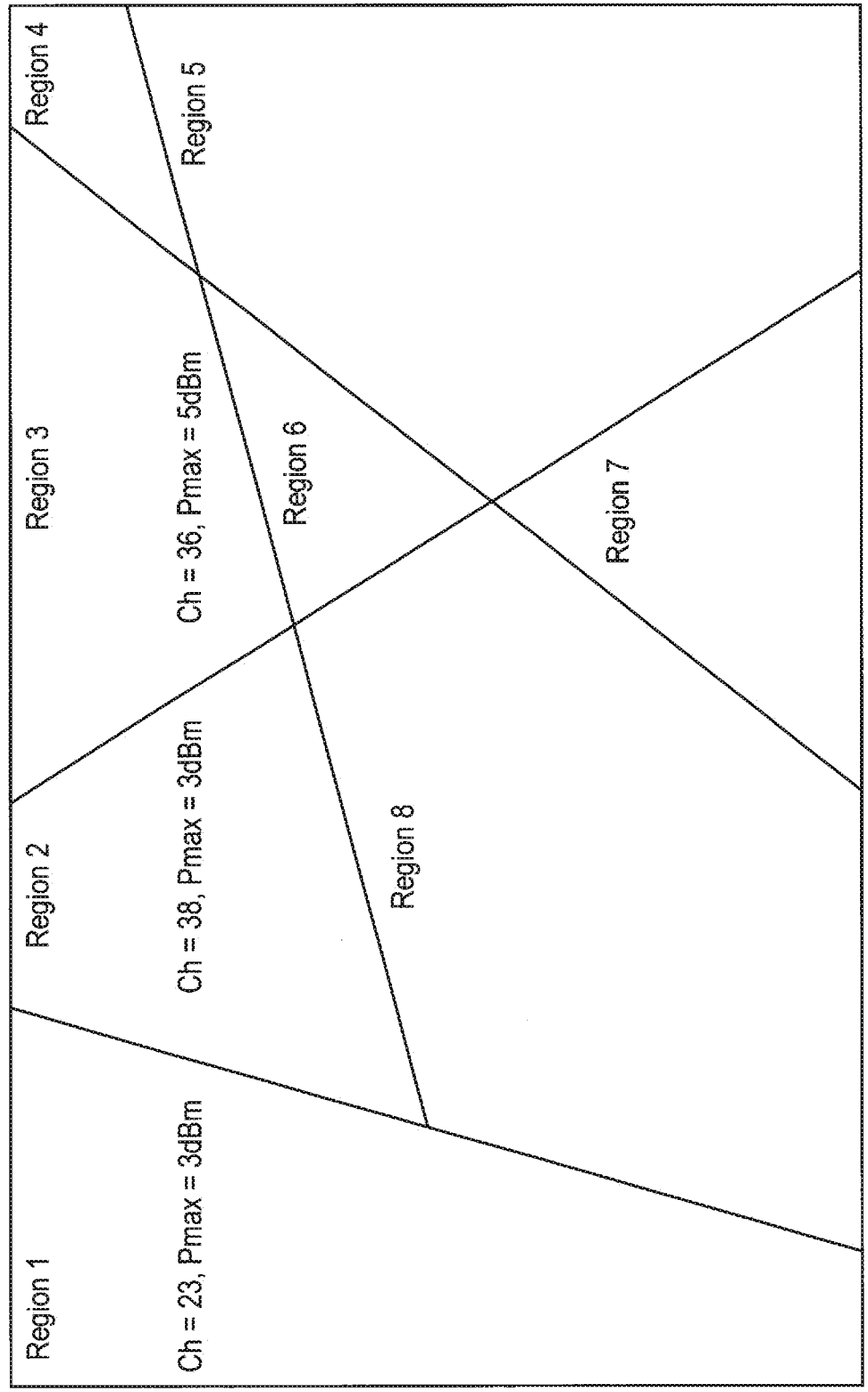
FIG. 6 is an explanatory view illustrating an example of a channel and transmission power set in each region by the list generated by the control unit 15.
Figure 7:
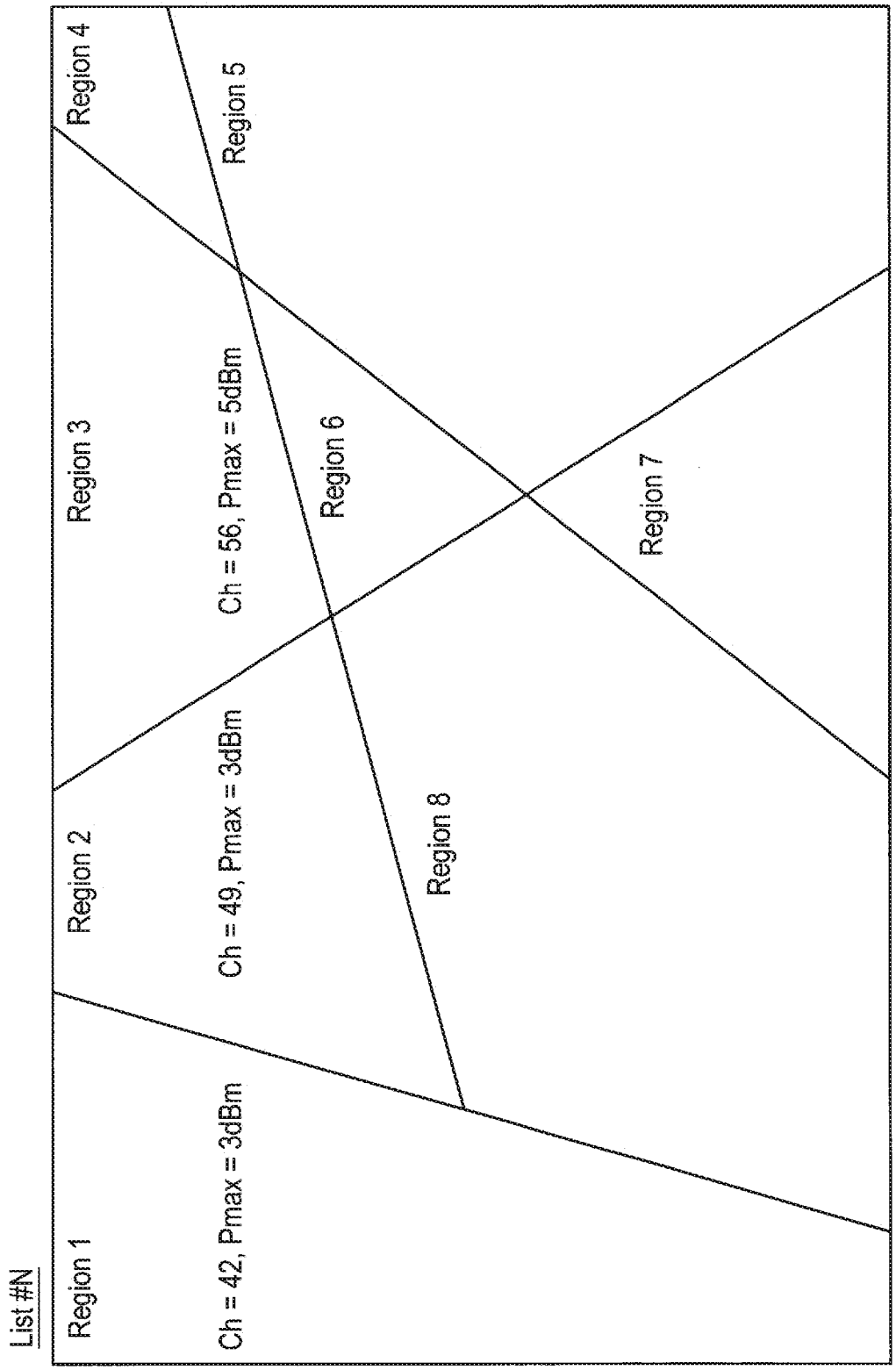
FIG. 7 is an explanatory view illustrating an example of a channel and transmission power set in each region by the list generated by the control unit 15.

FIG. 4 to FIG. 7 are explanatory views illustrating examples of channels and transmission power set for each region by the lists generated by the control unit 15. FIG. 4 illustrates an example of a channel and transmission power set in each region by List #1 which is a recommended channel list generated by the control unit 15. FIG. 5 illustrates an example of a channel and transmission power set in each region by List #2 which is a recommended channel list generated by the control unit 15. FIG. 6 illustrates an example of a channel and transmission power set in each region by List #3 which is a recommended channel list generated by the control unit 15. FIG. 7 illustrates an example of a channel and transmission power set in each region by List #N which is a recommended channel list generated by the control unit 15.

When attention is focused on one Region 1, in List #1, ch 21 is set in Region 1. In another List #2, ch 22 is set in Region 1. In still another List #3, ch 23 is set in Region 1. In yet another List #N, ch 42 is set in Region 1.

When attention is focused on another Region 2, in List #1, ch 36 is set in Region 2. In another List #2, ch 37 is set in Region 2. In still another List #3, ch 38 is set in Region 2. In yet another List #N, ch 49 is set in Region 2.

When attention is focused on another Region 3, in List #1, ch 45 is set in Region 3. In another List #2, ch 46 is set in Region 3. In still another List #3, ch 36 is set in Region 3. In yet another List #N, ch 56 is set in Region 3.

In this manner, the control unit 15 generates a plurality of recommended channel lists which are set so that a frequency is not set in an overlapped manner in the same region. By the control unit 15 generating such recommended channel lists, in the case where the wireless communication device 200 is mounted on the mobile body 30, it is possible to reduce a possibility of occurrence of interference by usage of the same channel by the wireless communication devices 200 without using complicated algorithm.

Further, by the control unit 15 generating such recommended channel lists, even in the case where a wireless communication device 200 which secondarily uses frequencies is newly registered in the communication system 1, the communication control determination device 10 does not have to recalculate frequency information and only has to provide the recommended channel lists generated in advance to the newly registered wireless communication device 200. Therefore, by the control unit 15 generating such recommended channel lists, it is possible to minimize calculation load in the case where a wireless communication device 200 is newly registered in the communication system 1.

The control unit 15 may determine a region on the basis of at least one of a plurality of criteria determined in advance when generating recommended channel lists. Examples of the criteria can include, for example, an address compartment, a census tract, control and jurisdiction space of the communication control determination device 10, a country, an area compartment, a map segmented with pixels. Therefore, in the information indicating a region in the recommended channel lists generated by the control unit 15, information on the basis of at least one of the above-described criteria can be described. The information indicating a region described in the recommended channel lists may be information indicated with a set made up of a plurality of pieces of geographical location information including latitude and longitude or may be information indicated with location information of a specific point and a circle around the specific point. Other than this, the information indicating a region may be information from which the communication control device 100 can understand a predetermined plane and space.

Further, the control unit 15 may generate recommended channel lists so that the same frequency channel is not used in the same region within one group when generating the recommended channel lists. That is, the control unit 15 may generate recommended channel lists so that the same frequency channel is used in the same region if groups are different. This is effective in the case where recommended channel lists belonging to different groups are provided in the case where interference does not occur even if the same frequency channel is used such as in relationship between a car and a flight vehicle such as a drone.

The storage unit 13, which is configured with, for example, an HDD, an SSD, a flash memory or other storage media, stores various kinds of information. In the present embodiment, the storage unit 13 stores the recommended channel lists generated by the control unit 15.

The functional configuration example of the communication control determination device 10 according to the first example of the embodiment of the present disclosure has been described above using FIG. 2. Subsequently, a functional configuration example of the communication control device 100 according to the first example of the embodiment of the present disclosure will be described.

(2) Communication Control Device 100

Figure 8:
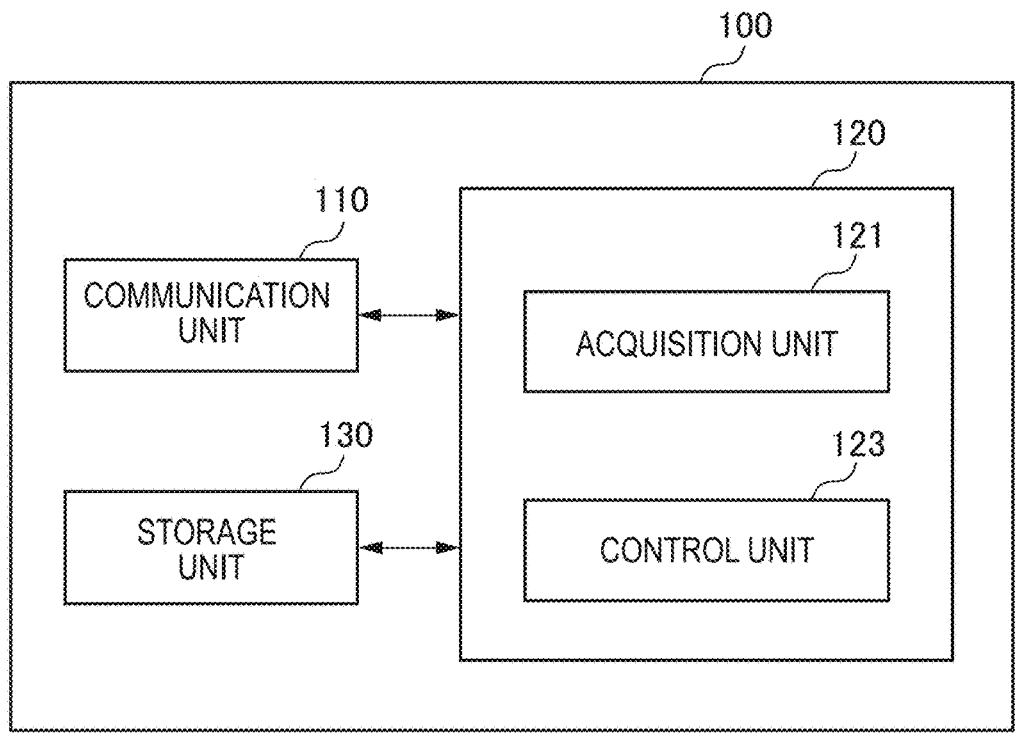
FIG. 8 is an explanatory view illustrating a functional configuration example of a communication control device 100 according to the first example of the embodiment.

FIG. 8 is an explanatory view illustrating the functional configuration example of the communication control device 100 according to the first example of the embodiment of the present disclosure. As illustrated in FIG. 8, the communication control device 100 includes a communication unit 110, a processing unit 120 and a storage unit 130. Further, the processing unit 120 includes an acquisition unit 121 and a control unit 123.

The communication unit 110 performs communication of information with another device. The communication unit 110 can, for example, include an antenna in a case of wireless communication and include an interface for wired communication in a case of wired communication. Further, the communication unit 110 can include a communication circuit for communication processing of information. The communication unit 110 transmits information received from another device to the processing unit 120.

The processing unit 120 is made up of, for example, a CPU, a ROM, a RAM, and the like and provides various functions of the communication control device 100. Note that the processing unit 120 can further include a constituent element in addition to the acquisition unit 121 and the control unit 123. That is, the processing unit 120 can also perform operation in addition to operation of the acquisition unit 121 and the control unit 123.

The acquisition unit 121 acquires various kinds of information that the communication unit 110 receives from another device. In the present embodiment, the acquisition unit 121 acquires the plurality of recommended channel lists generated by the communication control determination device 10.

The control unit 123 controls operation of the communication control device 100. In a case where the control unit 123 controls operation of the communication control device 100, the control unit 123 can use information acquired by the acquisition unit 121 and information stored on the storage unit 130.

In the present embodiment, the control unit 123 selects one of the plurality of recommended channel lists generated by the communication control device 10 and provides information to the wireless communication device 200 so that the wireless communication device 200 operates using a frequency channel and transmission power which matches a current geographical location of the wireless communication device 200 among frequency channels and transmission power which can be used and which are described in the selected recommended channel list, as operational parameters. Therefore, the control unit 123 can function as an example of a setting unit of the present disclosure. Note that information of the current geographical location of the wireless communication device 200 may be acquired by a positioning sensor for acquiring location information, which is provided at the wireless communication device 200, or may be acquired by a positioning sensor for acquiring location information, which is provided at the mobile body 30. Examples of the positioning sensor for acquiring location information can include, for example, specifically, a global navigation satellite system (GNSS) receiver and/or a communication device, or the like. The GNSS can include, for example, a global positioning system (GPS), a global navigation satellite system (GLONASS), a BeiDou navigation satellite system (BDS), a quasi-zenith satellites system (QZSS), a Galileo, or the like. Further, examples of the positioning sensor can include, for example, a positioning sensor which detects a location by utilizing a technology such as a wireless LAN, multi-input multi-output (MIMO), cellular communication (for example, location detection using a mobile base station, a femtocell) and near field communication (for example, Bluetooth low energy (BLE), Bluetooth (registered trademark)).

The storage unit 130 is made up of, for example, an HDD, an SSD, a flash memory, and other another storage media and stores various kinds of information.

As a result of the communication control device 100 having such a configuration, the communication control device 100 can acquire the plurality of recommended channel lists generated by the communication control determination device 10, select one recommended channel list from the plurality of recommended channel lists, provide information to the wireless communication device 200 so that the wireless communication device 200 operates using operational parameters which match a current geographical location.

The functional configuration example of the communication control device 100 according to the first example of the embodiment of the present disclosure has been described above using FIG. 8. Subsequently, the functional configuration example of the wireless communication device 200 according to the first example of the embodiment of the present disclosure will be described.

(3) Wireless Communication Device 200

Figure 9:
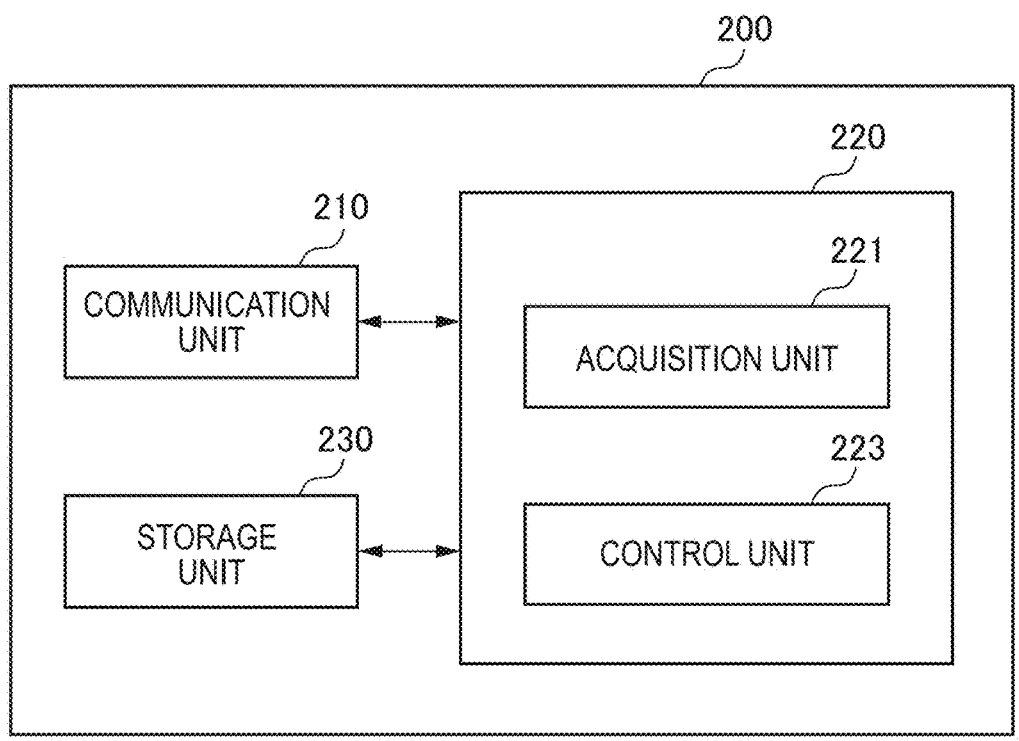
FIG. 9 is an explanatory view illustrating a functional configuration example of a wireless communication device 200 according to the first example of the embodiment.

FIG. 9 is an explanatory view illustrating a functional configuration example of the wireless communication device 200 according to the first example of an embodiment of the present disclosure. As illustrated in FIG. 9, the wireless communication device 200 includes a communication unit 210, a processing unit 220, and a storage unit 230. Further, the processing unit 220 includes an acquisition unit 221 and a control unit 223.

The communication unit 210 performs communication of information with another device. The communication unit 210 can, for example, include an antenna in a case of wireless communication and include an interface for wired communication in a case of wired communication. Further, the communication unit 210 can include a communication circuit for communication processing of information. The communication unit 210 transmits information received from another device to the processing unit 220.

The processing unit 220 is made up of, for example, a CPU, a ROM, a RAM, and the like and provides various functions of the wireless communication device 200. Note that the processing unit 220 can further include a constituent element in addition to the acquisition unit 221 and the control unit 223. That is, the processing unit 220 can also perform operation in addition to operation of the acquisition unit 221 and the control unit 223.

The acquisition unit 221 acquires various kinds of information received by the communication unit 210 from other devices. In the present embodiment, the acquisition unit 221 acquires the operational parameters determined by the communication control device 100.

The control unit 223 controls operation of the wireless communication device 200. The control unit 223 can use the information acquired by the acquisition unit 221 and the information stored in the storage unit 230 when controlling the operation of the communication control device 100. In the present embodiment, the control unit 223 determines a frequency channel to be secondarily used and transmission power of the frequency channel on the basis of the operational parameters acquired by the acquisition unit 221.

The functional configuration example of the wireless communication device 200 according to the first example of the embodiment of the present disclosure has been described above using FIG. 9. Subsequently, an operation example of the communication system 1 according to the first example of the embodiment of the present disclosure will be described.

1.2.3. Operation Example

Figure 10:
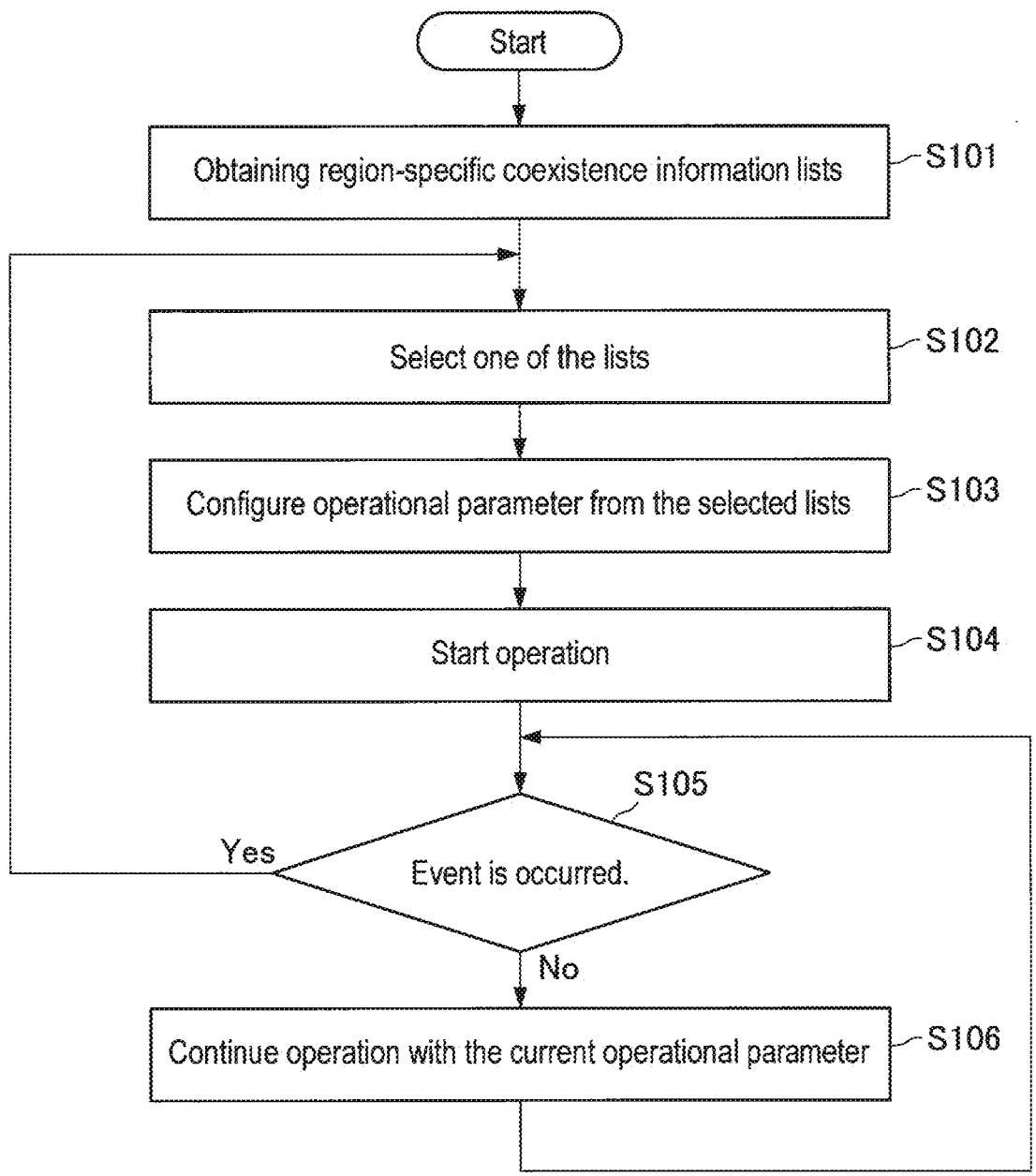
FIG. 10 is a flowchart illustrating an operation example of the communication system 1, particularly, an operation example of the communication control device 100 according to the first example of the embodiment.

FIG. 10 is a flowchart illustrating an operation example of the communication system 1, particularly, an operation example of the communication control device 100 according to the first example of the embodiment of the present disclosure. FIG. 10 illustrates an operation example in the case where the communication control device 100 acquires the above-described recommended channel lists from the communication control determination device 10 and determines operational parameters. The operation example of the communication control device 100 according to the first example of the embodiment of the present disclosure will be described below using FIG. 10.

The communication control device 100 first acquires the above-described plurality of recommended channel lists from the communication control determination device 10 (step S101). The processing in step S101 is, for example, performed by the acquisition unit 121. The communication control device 100 may hold the plurality of recommended channel lists acquired from the communication control determination device 10 in the storage unit 130.

When the communication control device 100 acquires the plurality of recommended channel lists from the communication control determination device 10, subsequently, the communication control device 100 selects one of the recommended channel lists (step S102). The processing in step S102 is, for example, performed by the control unit 123. When the communication control device 100 selects one recommended channel list from the plurality of recommended channel lists, the communication control device 100 may completely randomly perform selection, or if the communication control device 100 has selected a recommended channel list before, may select the same recommended channel list or may select a different recommended channel list. For example, if the communication control device 100 has selected List #1 before, the communication control device 100 may select the same List #1 or may select a different recommended channel list, for example, List #2 which is the next-numbered recommended channel list.

When the communication control device 100 selects one recommended channel list from the acquired plurality of recommended channel lists, subsequently, the communication control device 100 sets operational parameters on the basis of the selected recommended channel list in accordance with a current geographical location of the wireless communication device 200 (step S103). The processing in step S103 is, for example, performed by the control unit 123.

For example, the communication control device 100 selects List #1 in the above-described step S102, and if the current geographical location of the wireless communication device 200 is within Region 1, the communication control device 100 sets channel 21 and transmission power of 10 dBm as the operational parameters from FIG. 3 and FIG. 4.

When the communication control device 100 sets the operational parameters on the basis of the selected recommended channel list in accordance with the current geographical location of the wireless communication device 200, subsequently, the communication control device 100 causes the wireless communication device 200 to operate using the set operational parameters (step S104). The processing in step S104 is, for example, performed by the control unit 123.

The communication control device 100 determines whether or not some kind of event occurs when the wireless communication device 200 operates using the operational parameters set at the wireless communication device 200 (step S105). The processing in step S105 is, for example, performed by the control unit 123. Determination in step S105 is, for example, determination of whether interference from other wireless communication devices 200 is observed, whether the wireless communication device 200 moves to another region across a boundary of geographical space used by the recommended channel list, or the like.

When it is detected that some kind of event occurs in the above-described step S105 (step S105: Yes), the processing returns to step S102, and the communication control device 100 selects one of the plurality of recommended channel lists acquired from the communication control determination device 10. In this event, the communication control device 100 may change a recommended channel list to be selected in accordance with the detected event.

For example, in the case where interference from other wireless communication devices 200 is observed as the event, the communication control device 100 selects a recommended channel list in which a channel observed to have a small interference amount at the current geographical location of the wireless communication device 200 is set at the geographical location. In the examples illustrated in FIG. 4 to FIG. 7, it is assumed that interference from other wireless communication devices 200 is observed in the case where channel 21 is used in Region 1. In this case, the communication control device 100 scans other channels and, if an interference amount of channel 23 is small, may select List #3 in which channel 23 is set in the processing in step S102 after the processing returns from step S105.

Further, for example, in the case where it is detected as the event that the wireless communication device 200 moves to another region across a boundary of geographical space used by the recommended channel list, the communication control device 100 selects a recommended channel list in which a channel which can be continuously used in a region of a destination is set. It is assumed that, in the case where channel 21 is used in Region 1, the wireless communication device 200 moves from Region 1 to Region 8. In this case, the communication control device 100 may select a recommended channel list in which channel 21 is set in Region 8 in the processing in step S102 after the processing returns from step S105. In the case where there is no recommended channel list in which a channel which can be continuously used in the region of the destination is set, the communication control device 100 may select a channel set in the region of the destination without changing the recommended channel list or may select a recommended channel list again.

Further, for example, in the case where it is detected as the event that the wireless communication device 200 moves to another region across the boundary of the geographical space used by the recommended channel list, the communication control device 100 scans channels, and if there is no interference or an interference amount is small in a channel which can be continuously used in the region of the destination, the communication control device 100 may select a recommended channel list in which a channel which can be continuously used in the region of the destination is set.

Meanwhile, in the case where it is not detected in the above-described step S105 that some kind of event occurs (step S105: No), the communication control device 100 causes operation of the wireless communication device 200 using the operational parameters at the time to be continued (step S106).

The communication control device 100 according to the embodiment of the present disclosure can set operational parameters at the wireless communication device 200 on the basis of the recommended channel lists generated by the communication control determination device 10 by executing the above-described series of operation. Further, the communication control device 100 according to the embodiment of the present disclosure can promptly reselect another recommended channel list if some kind of event occurs by executing the above-described series of operation.

Note that, while, in the above-described example, an example has been described where the communication control device 100 selects a recommended channel list, the present disclosure is not limited to such an example. The processing of selecting a recommended channel list may be performed by the wireless communication device 200.

Subsequently, an overall operation example of the communication system 1 according to the first example of the embodiment of the present disclosure will be described.

Figure 11:
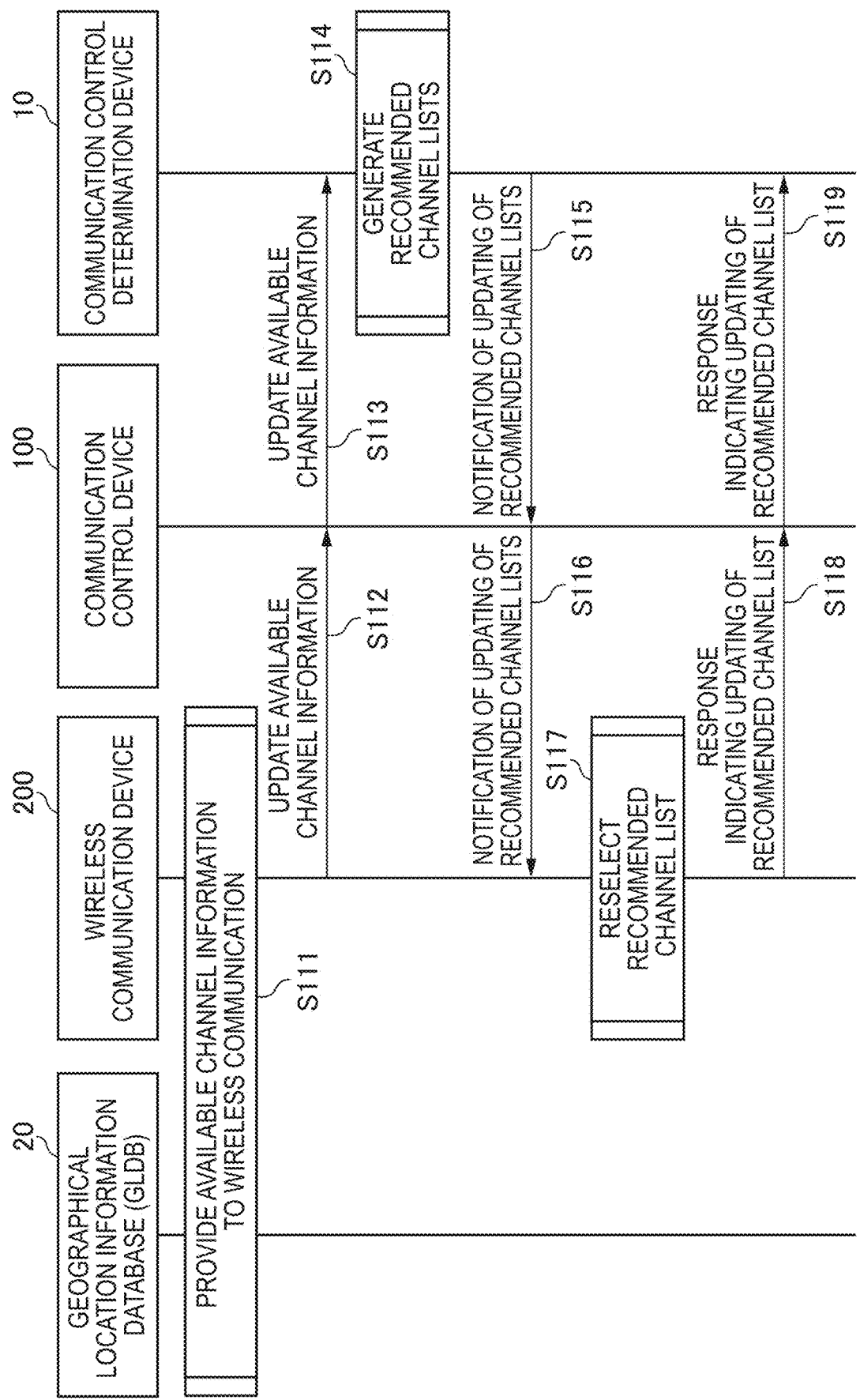
FIG. 11 is a flowchart illustrating an overall operation example of the communication system 1 according to the first example of the embodiment.

FIG. 11 is a flowchart illustrating an overall operation example of the communication system 1 according to the first example of the embodiment of the present disclosure. The overall operation example of the communication system 1 according to the first example of the embodiment of the present disclosure will be described below using FIG. 11.

In a frequency band used by a broadcast station which performs television broadcasting, it is necessary to protect programme making and special events (PMSE, a wireless microphone used in program making, an event, or the like) as well as digital television broadcasting. Further, it is necessary to protect radio waves in a 5 GHz band used by a satellite in use outdoors. Further, in a 3.5 GHz band in the U.S.A., a dedicated sensor called environmental sensing capability (ESC) has a function of detecting radio waves (such as a military radar) used by a primary operator and notifying a database. Of course, not only these bands, because a usage situation of the frequency used by the primary operator can dynamically change, the communication control device 10 needs to generate recommended channel lists for coexistence services while coping with change of the usage situation of the frequencies. FIG. 11 illustrates an operation example in which the communication control determination device 10 regenerates the recommended channel lists which have been generated once to cope with change of a usage situation of the frequencies and provides the recommended channel lists to the communication control device 100.

In the example in FIG. 11, the GLDB 20 provides information of channels which can be secondarily used by the wireless communication device 200, to the wireless communication device 200 (step S111). The GLDB 20, for example, holds information of channels which can be secondarily used in, for example, a 3.5 GHz band, a 5 GHz band, or the like. When the wireless communication device 200 acquires the information of channels which can be secondarily used from the GLDB 20, the wireless communication device 200 transmits the acquired information of channels which can be secondarily used to the communication control device 100 (step S112). When the communication control device 100 acquires the information of channels which can be secondarily used from the wireless communication device 200, the communication control device 100 transmits the acquired information of channels which can be secondarily used to the communication control determination device 10 (step S113).

When the communication control determination device 10 acquires the information of channels which can be secondarily used from the communication control device 100, the communication control determination device 10 generates a plurality of recommended channel lists recommended to be used to the wireless communication device 200 on the basis of the acquired information (step S114). The processing in step S114 is, for example, executed by the control unit 15.

When the communication control determination device 10 generates a plurality of recommended channel lists in step S114, the communication control determination device 10 provides the generated plurality of recommended channel lists to the communication control device 100 (step S115). When the communication control device 100 receives the plurality of recommended channel lists from the communication control determination device 10, the communication control device 100 provides the received plurality of recommended channel lists to the wireless communication device 200 (step S116).

When the wireless communication device 200 receives the plurality of recommended channel lists from the communication control device 100, the wireless communication device 200 reselects one recommended channel list from the plurality of recommended channel lists and sets operational parameters in accordance with a current geographical location (step S117).

When the wireless communication device 200 reselects one recommended channel list from the plurality of recommended channel lists, the wireless communication device 200 transmits a response indicating updating of the selected recommended channel list to the communication control device 100 (step S118). When the communication control device 100 receives the response indicating updating of the recommended channel list from the wireless communication device 200, the communication control device 100 transmits the response indicating updating of the recommended channel list to the communication control determination device 10 (step S119).

Note that there can be a case where the communication control determination device 10 does not require a response indicating updating of the recommended channel list. Therefore, the processing in step S118 and S119 does not have to be performed.

The respective devices constituting the communication system 1 according to the first example of the embodiment of the present disclosure can cope with change of a usage situation of frequencies used by the primary system by executing the above-described series of operation.

1.3. Second Example

1.3.1. Overall System Configuration

Figure 12:
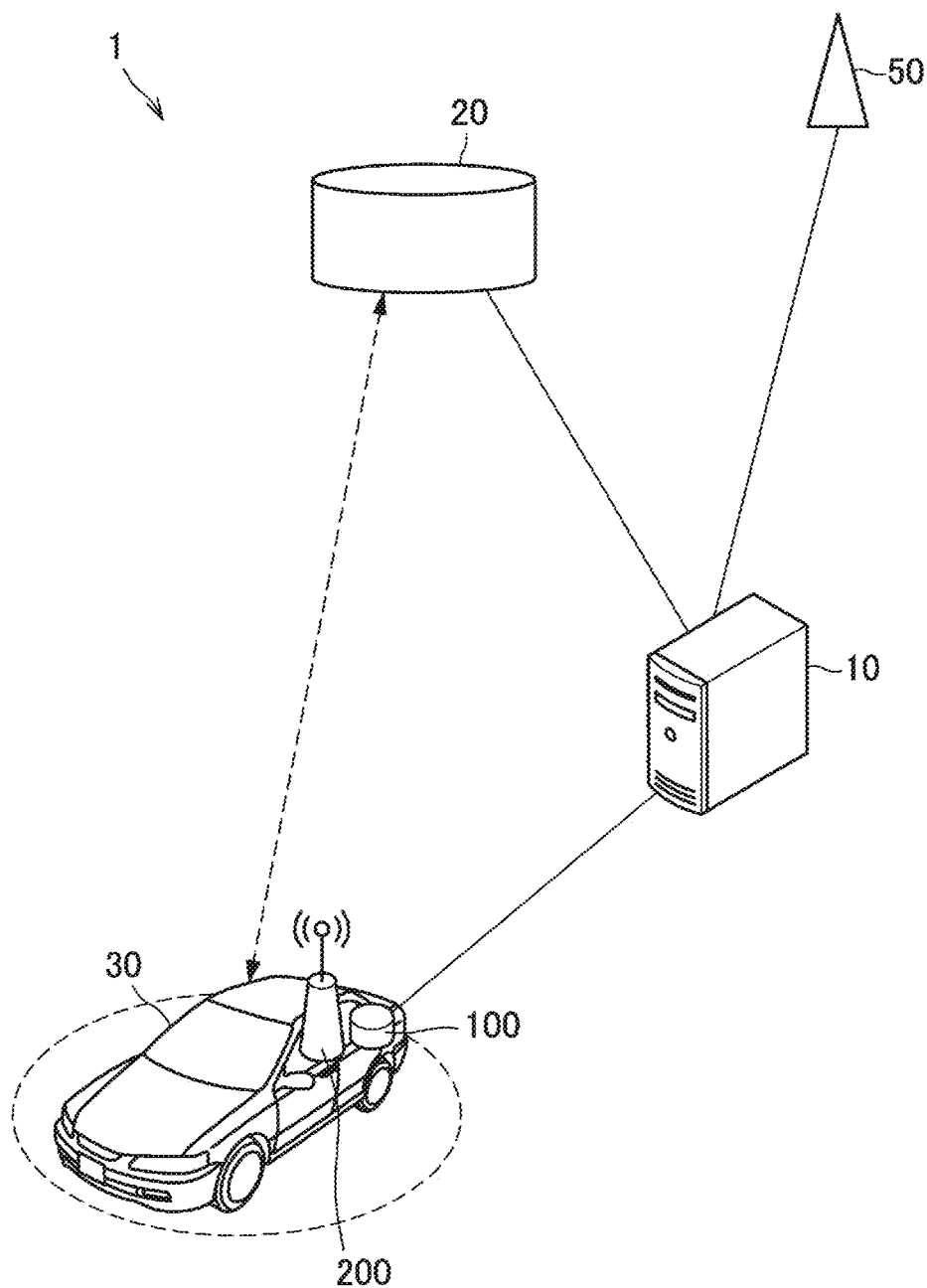
FIG. 12 is an explanatory view illustrating an overall configuration example of a communication system 1 according to a second example of the embodiment.

FIG. 12 is an explanatory view illustrating an overall configuration example of the communication system 1 according to the second example of the embodiment of the present disclosure. The overall configuration example of the communication system 1 according to the second example of the embodiment will be described below using FIG. 12.

FIG. 12 illustrates the overall configuration example of the communication system 1 in which a dedicated sensor node 50 which detects radio waves used by a primary operator is added to the configuration of the first example.

The dedicated sensor node 50, which is a node that detects radio waves used by the primary operator, has a function of providing a detected situation to the communication control determination device 10.

Figure 13:
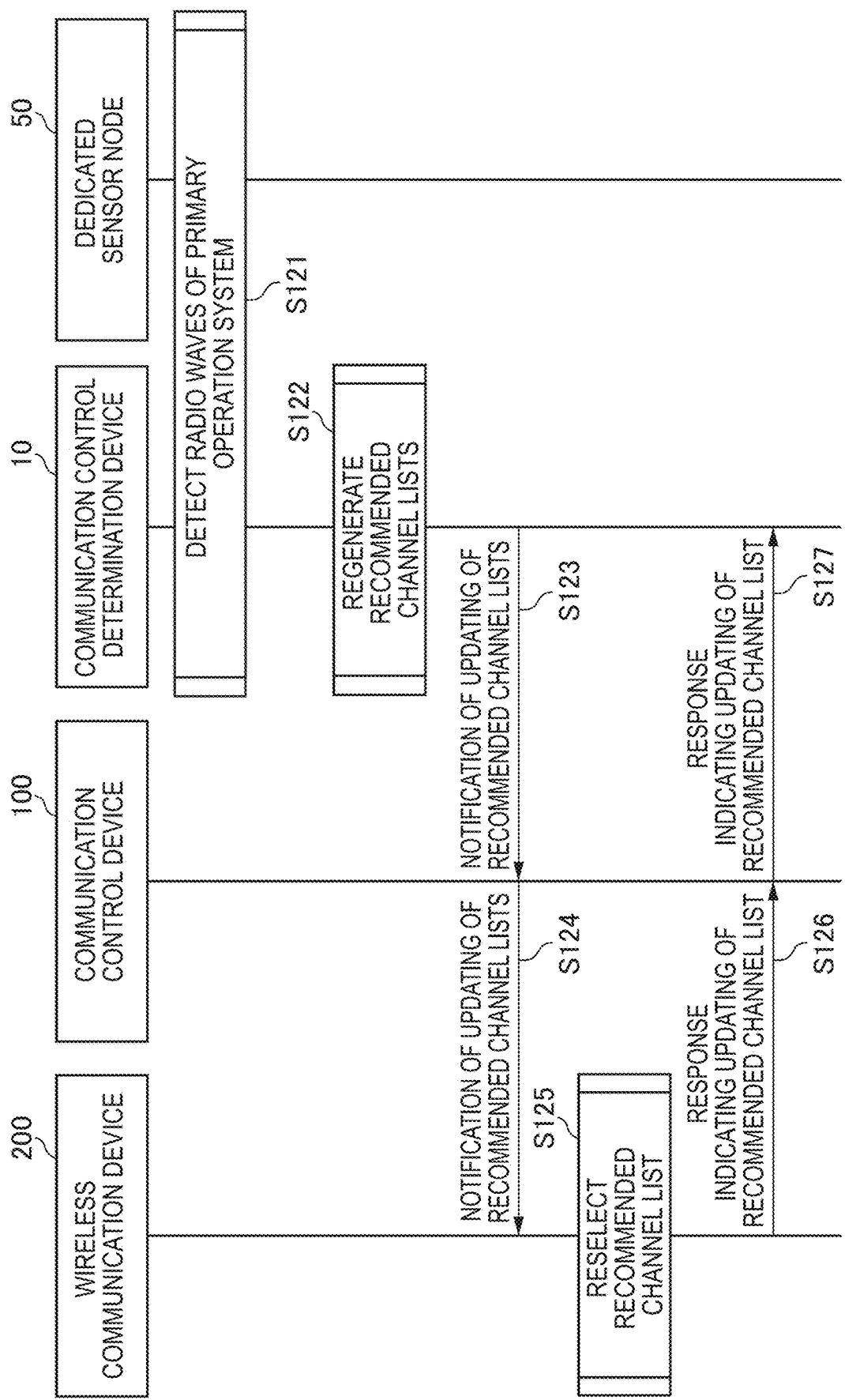
FIG. 13 is a flowchart illustrating an overall operation example of the communication system 1 according to the second example of the embodiment.

FIG. 13 is a flowchart illustrating the overall operation example of the communication system 1 according to the second example of the embodiment of the present disclosure. The overall operation example of the communication system 1 according to the second example of the embodiment of the present disclosure will be described below using FIG. 13.

When the dedicated sensor node 50 detects radio waves of the primary operation system used by the primary operator, the dedicated sensor node 50 provides the detected information to the communication control determination device 10 (step S121).

The communication control determination device 10 which acquires the information of detection of the radio waves of the primary operation system used by the primary operator from the dedicated sensor node 50 generates a plurality of recommended channel lists which are recommended to be used to the wireless communication device 200 on the basis of the acquired information (step S122). The processing in step S122 is, for example, executed by the control unit 15.

When the communication control determination device 10 generates the plurality of recommended channel lists in step S122, the communication control determination device 10 provides the generated plurality of recommended channel lists to the communication control device 100 (step S123). When the communication control device 100 receives the plurality of recommended channel lists from the communication control determination device 10, the communication control device 100 provides the received plurality of recommended channel lists to the wireless communication device 200 (step S124).

When the wireless communication device 200 receives the plurality of recommended channel lists from the communication control device 100, the wireless communication device 200 reselects one recommended channel list from the plurality of recommended channel lists and sets operational parameters in accordance with the current geographical location (step S125).

When the wireless communication device 200 reselects one recommended channel list from the plurality of recommended channel lists, the wireless communication device 200 transmits a response indicating updating of the selected recommended channel list to the communication control device 100 (step S126). When the communication control device 100 receives the response indicating updating of the recommended channel list from the wireless communication device 200, the communication control device 100 transmits the response indicating updating of the recommended channel list to the communication control determination device 10 (step S127).

Note that there can be a case where the communication control determination device 10 does not require a response indicating updating of the recommended channel list. Therefore, the processing in step S126 and S127 does not have to be performed.

The respective devices which constitute the communication system 1 according to the first example of the embodiment of the present disclosure can cope with change of a usage situation of frequencies used by the primary system by executing the above-described series of operation.

Note that, while, in the above-described example, an example has been described in which when the dedicated sensor node 50 detects radio waves of the primary operation system used by the primary operator, the dedicated sensor node 50 provides the detected information to the communication control determination device 10, the present disclosure is not limited to such an example. For example, if radio waves of a frequency which have been detected until then are no longer detected, the dedicated sensor node 50 may provide information indicating that the radio waves are no longer detected to the communication control determination device 10.

1.4. Third Example

Figure 14:
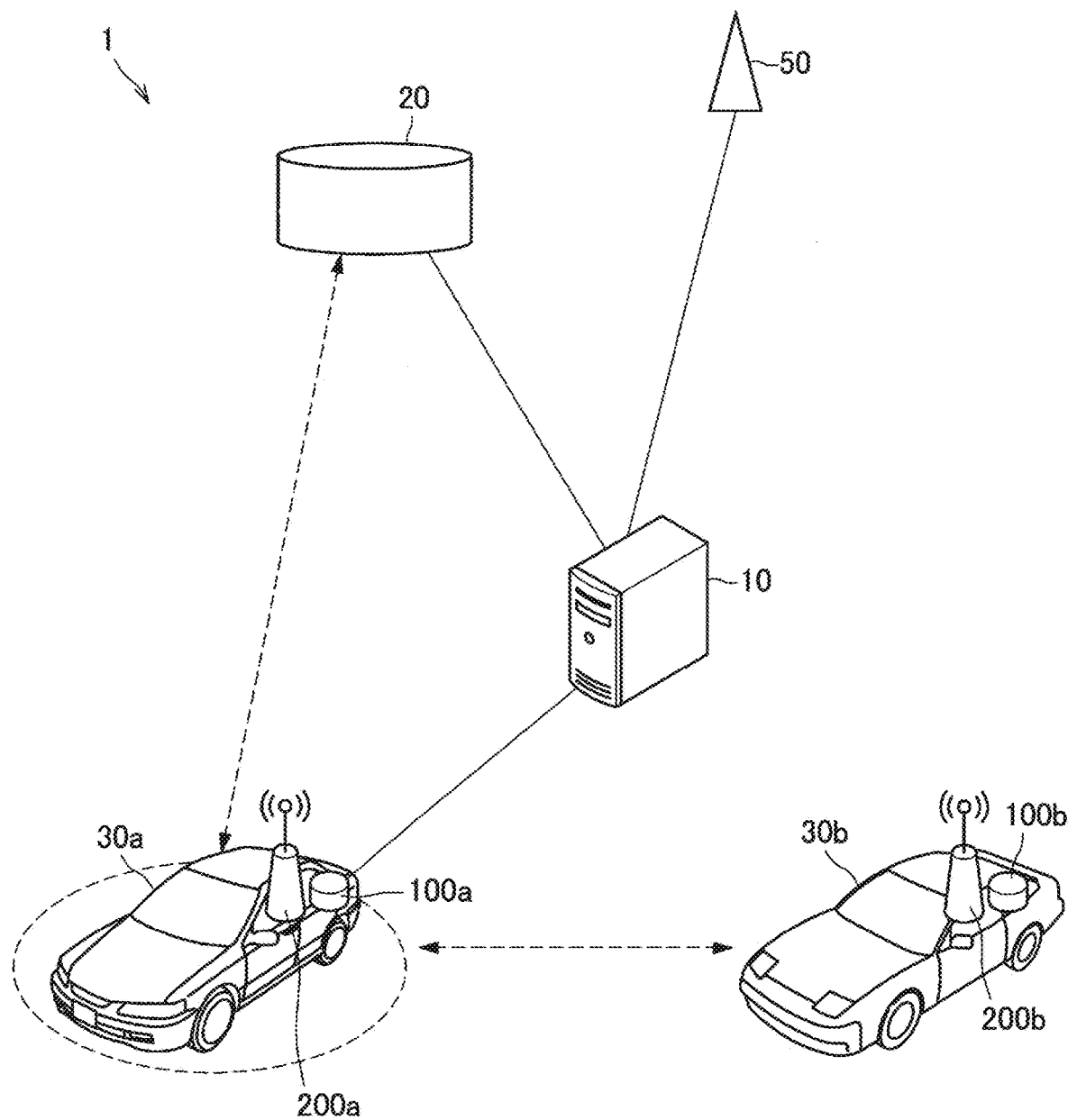
FIG. 14 is an explanatory view illustrating an overall configuration example of a communication system 1 according to a third example of the embodiment.

FIG. 14 is an explanatory view illustrating an overall configuration example of a communication system 1 according to a third example of the embodiment of the present disclosure. The overall configuration example of the communication system 1 according to the third example of the embodiment will be described below using FIG. 14.

The third example illustrated in FIG. 14 is an example in the case where a communication control device 100*a* and a wireless communication device 200*a* provided at a mobile body 30*a* operate as masters, while a communication control device 100*b* and a wireless communication device 200*b* provided at a mobile body 30*b* operate as slaves. This example assumes a case where a state where a distance between the mobile body 30*a* and the mobile body 30*b* is relatively short is continued for a certain period such as, for example, a case where the mobile body 30*a* and the mobile body 30*b* travel in parallel. Functional configuration examples of the communication control devices 100*a* and 100*b* are similar to the functional configuration example of the communication control device 100 described using FIG. 8.

The communication control device 100*a* and the communication control device 100*b* respectively acquire recommended channel lists from the communication control determination device 10, select one from the recommended channel lists and set frequency channels and transmission power. The communication control device 100*a* and the communication control device 100*b* may then exchange information of recommended channel lists which are currently selected.

In the case where the communication control device 100*a* and the wireless communication device 200*a* operate as masters, and the communication control device 100*b* and the wireless communication device 200*b* operate as slaves in this manner, the communication control device 100*a* may notify the communication control device 100*b* of information of a recommended channel list which is currently used. The communication control device 100*b* can select a recommended channel list at the communication control device 100*b* on the basis of the information of the recommended channel list which is currently used by the communication control device 100*a*. That is, it is possible to prevent interference between the wireless communication device 200*a* and the wireless communication device 200*b* by the communication control device 100*b* selecting a recommended channel list which is not currently used by the communication control device 100*a*.

1.5. Modified Example

The communication control determination device 10 may generate recommended channel lists which can be used in advance at certain time. For example, the communication control determination device 10 may generate recommended channel lists separately at time when the number of users rapidly increases at a certain location as a result of an event being held, or the like, and at other times. That is, at time when the number of users rapidly increases at a certain location as a result of an event being held, or the like, in a region including the location, the communication control determination device 10 may generate recommended channel lists while avoiding a frequency used by the event.

2. CONCLUSION

As described above, according to the embodiment of the present disclosure, the communication control determination device 10 which generates recommended channel lists in which information of a frequency channel and transmission power recommended to be used for each region is described and the communication control device 100 which acquires the recommended channel lists from the communication control determination device 10 and sets a frequency channel and transmission power to be used as operational parameters on the basis of a current geographical location of the wireless communication device 200, are provided.

The communication control determination device 10 generates a plurality of recommended channel lists. The communication control determination device 10 then generates the recommend channel lists so that the same frequency channel is not set in the same region when generating the plurality of recommended channel lists. By the communication control determination device 10 generating a plurality of recommended channel lists in this manner, in the case where a plurality of wireless communication devices 200 exist in the same region, it is possible to reduce a possibility of occurrence of interference by radio waves output by the wireless communication devices 200.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A server device including:

a control unit configured to provide a plurality of lists in which an available frequency and transmission power of the frequency are described for each predetermined range determined on a basis of a predetermined criterion so that the frequency is not set in an overlapped manner in the same predetermined range, to an external device which uses the frequency.

(2)

The server device according to (1), in which the available frequency is a frequency included in the frequency which is not used by a system whose operation is approved on a basis of license in a frequency band allowed to be used by the system.

(3)

The server device according to (2), in which the control unit generates the plurality of lists on a basis of information of the available frequency.

(4)

The server device according to (3), in which the control unit regenerates the generated plurality of lists when it is detected that the information of the available frequency changes.

(5)

The server device according to (3), in which the control unit regenerates the generated plurality of lists on a basis of the information of the available frequency which is notified from the external device.

(6)

The server device according to any one of (3) to (5), in which the control unit regenerates the generated plurality of lists on a basis of notification of detection of a radio wave in the available frequency band which is notified from a device configured to detect a radio wave of the system.

(7)

The server device according to any one of (1) to (6), in which the control unit generates the lists in which content is different at certain time.

(8)

An information processing device including:

a communication unit configured to receive a plurality of lists in which an available frequency and transmission power of the frequency are described for each predetermined range determined on a basis of a predetermined criterion so that the frequency is not set in an overlapped manner in the same predetermined range, from an external device; and a setting unit configured to select one list from the plurality of lists received by the communication unit using a predetermined criterion and set the frequency and transmission power of the frequency described in the selected list as parameters on a basis of current location information.

(9)

The information processing device according to (8), in which the setting unit reselects the list in a case where a predetermined condition is satisfied.

(10)

The information processing device according to (9), in which the setting unit reselects the list in a case where interference is detected in the available frequency as the predetermined condition.

(11)
The information processing device according to (10), in which the setting unit reselects the list in which a frequency with a smallest interference amount is set in the case where interference is detected in the available frequency as the predetermined condition.

(12)
The information processing device according to (9), in which the setting unit reselects the list in a case where a boundary of the range is crossed as the predetermined condition.

(13)
The information processing device according to (12), in which the setting unit reselects the list in which a same frequency is set in the case where the boundary of the range is crossed as the predetermined condition.

(14)
The information processing device according to (13), in which the setting unit reselects the list in which a same frequency is set if there is no interference as a result of a frequency which has been used being scanned in the case where the boundary of the range is crossed as the predetermined condition.

(15)
The information processing device according to any one of (8) to (14), in which the communication unit transmits information relating to the list selected by the setting unit to the external device.

(16)
The information processing device according to any one of (8) to (15), in which the setting unit sets the frequency to be used by a device provided at a mobile body.

(17)
A method including:
providing a plurality of lists in which an available frequency and transmission power of the frequency are described for each predetermined range determined on a basis of a predetermined criterion so that the frequency is not set in an overlapped manner in the same predetermined range, to an external device which uses the frequency.

(18)
A method including:
receiving a plurality of lists in which an available frequency and transmission power of the frequency are described for each predetermined range determined on a basis of a predetermined criterion so that the frequency is not set in an overlapped manner in the same predetermined range, from an external device; and
selecting one list from the received plurality of lists using a predetermined criterion and setting the available frequency and transmission power of the frequency described in the selected list as parameters on a basis of current location information.

REFERENCE SIGNS LIST 10 communication control determination device
20 GLDB
100 communication control device
200 wireless communication device

The invention claimed is:
1. A computing device comprising:
circuitry configured to
transmit, to a server device, information of channels that can be used; and
receive a plurality of lists from the server device,
wherein the plurality of lists is generated from the information of the channels that can be used, such that each of the plurality of lists identifies a plurality of ranges and indicates an available frequency and transmission power of the frequency for each of the plurality of ranges, each of the plurality of ranges being a geographic region, such that each of the plurality of lists identifies a plurality of geographic regions,
the plurality of geographic regions is a same plurality of geographic regions for all of the plurality of lists, and
the frequency corresponding to any one of the plurality of ranges in any one of the plurality of lists is not set in an overlapped manner to the frequency corresponding to the same one of the plurality of ranges in any other one of the plurality of lists.

2. The computing device according to claim 1,
wherein the frequency is a frequency included in a plurality of frequencies that are not used by a system whose operation is approved on a basis of license, the plurality of frequencies being in a frequency band allowed to be used by the system.

3. The computing device according to claim 2,
wherein the plurality of lists are generated on a basis of information of the available frequency.

4. The computing device according to claim 3,
wherein the plurality of lists are generated when it is detected that the information of the available frequency changes.

5. The computing device according to claim 3,
wherein the plurality of lists are generated on a basis of the information of the available frequency which is notified from the external device.

6. The computing device according to claim 3,
wherein the plurality of lists are generated on a basis of notification of detection of a radio wave in the available frequency band which is notified from the external device.

7. The computing device according to claim 1,
wherein, in the lists, content varies with time.

8. A method comprising:
transmitting, to a server device, information of channels that can be used; and
receiving a plurality of lists from the server device,
wherein the plurality of lists is generated from the information of the channels that can be used, such that each of the plurality of lists identifies a plurality of ranges and indicates an available frequency and transmission power of the frequency for each of the plurality of ranges, each of the plurality of ranges being a geographic region, such that each of the plurality of lists identifies a plurality of geographic regions,
the plurality of geographic regions is a same plurality of geographic regions for all of the plurality of lists, and
the frequency corresponding to any one of the plurality of ranges in any one of the plurality of lists is not set in an overlapped manner to the frequency corresponding to the same one of the plurality of ranges in any other one of the plurality of lists.

* * * * *